United States Patent
Ueda

(10) Patent No.: US 6,343,332 B1
(45) Date of Patent: Jan. 29, 2002

(54) COMMUNICATION LINK INFORMATION GENERATING DEVICE, A THREE-TIER CLIENT/SERVER SYSTEM, AND A MEDIUM STORING A COMMUNICATION LINK INFORMATION GENERATOR PROGRAM

(75) Inventor: Takuji Ueda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/042,801

(22) Filed: Mar. 17, 1998

(30) Foreign Application Priority Data

Oct. 20, 1997 (JP) .............................. 9-286643

(51) Int. Cl.[7] .............................................. G06F 9/54
(52) U.S. Cl. ........................ 709/320; 709/316; 709/203
(58) Field of Search ................................ 709/200–332, 709/104–106; 717/1, 2

(56) References Cited

U.S. PATENT DOCUMENTS 5,457,797 A * 10/1995 Butterworth et al. ....... 709/320
6,041,365 A * 3/2000 Kleinerman ................ 709/328

OTHER PUBLICATIONS

Michael, Vizard, "Web of intrigue: distributed object technologies put enterprise spin on C/S systems," PC Week, v12, n1, p77(2), Jan. 9, 1995.*

Overstreet, Chip, Three–Tier Delphi, Delphi Informant, pp(5), Sep. 1996.*

* cited by examiner

Primary Examiner—St. John Courtenay, III
(74) Attorney, Agent, or Firm—Staas & Halsey LLP

(57) ABSTRACT

A communication link information generating device for generating link information for communications in a three-tier system in which a general-purpose computer, which operates in a non-distributed object environment, is applied to a distributed object environment. In the communication link information generating device, an input device reads an application definition set in which communication information for three tiers is collectively defined, and an analyzer analyzes the application definition set. Based on the application definition set, an interface definition language (IDL) source creating device creates an interface definition language source for a client/server system, a source code generating device generates a source code of an application of a server system serving as a gateway, and an interface information file generating device generates an interface information file for a server application of the general-purpose computer, whereby linkage of different environments is achieved.

5 Claims, 7 Drawing Sheets

```
┌──── APPLICATION DEFINITION ─────────────────┐
│                                             │
│  OBJECT (OPERATION)                         │
│                                             │
│        COMMUNICATION DESTINATION = S1       │
│                                             │
│        INTERFACE INFORMATION                │
│                                             │
│                                             │
│  (SIMILAR DEFINITION REPEATED)              │
│                                             │
│                    .                        │
│                    .                        │
│                    .                        │
│                                             │
└─────────────────────────────────────────────┘
```
↙11

FIG. 3

COMMUNICATION LINK INFORMATION GENERATING DEVICE, A THREE-TIER CLIENT/SERVER SYSTEM, AND A MEDIUM STORING A COMMUNICATION LINK INFORMATION GENERATOR PROGRAM

BACKGROUND OF THE INVENTION

(1) Field of the Invention

The present invention relates to a communication link information generating device, and more particularly, to a communication link information generating device for generating inter-applications communication link information for a three-tier client/server system constituted, for example, by a client/server system utilizing a distributed object-oriented technique for communications therein and a general-purpose computer having no distributed object environment.

(2) Description of the Related Art

A client/server system is a system in which the functions of applications are distributed to clients and servers so that processes may be executed cooperatively by the entire system via a network. In a system of such configuration, a client is primarily dedicated to being a user interface, while the principal objective of a server is to accept a request from a client generated during an interactive process with a user and to perform the necessary process. Each client has the function of executing a process in response to an event occurring with reference to the user interface, and accordingly, increased functions inevitably tend to increase the client's load. Therefore, in order to avoid close connections of the functions and to impart expansibility and flexibility to the system, there has been proposed a hierarchical system having a multi-tier system configuration such that at least one tier intervenes between the client tier and the server tier.

In client/server systems, there is also a demand for enhancement in the reliability, expansibility and flexibility of inter-applications communications, and a distributed object environment is one environment that meets the demand.

Object-oriented development in which an application is regarded as an object is spreading widely as a technique of improving the efficiency of program development. Among such techniques, CORBA (Common Object Request Broker Architecture) is the set of rules for a distributed object-oriented technique defined by the OMG (Object Management Group) whereby, in a distributed system, a client application can retrieve a server application without the need to recognize the location or packaging thereof.

With CORBA, the interface information of a server application is laid open for common use on the network of the client/server system, so that a client application can readily make use of the server application as if it is calling a program within a local system. The functions and software for communicating between objects are called ORB (Object Request Broker), and IIOP (Internet Inter-ORB Protocol) is adopted as a communication procedure for inter-ORB connections.

FIG. 7 exemplifies the configuration of a three-tier system. In FIG. 7, the three-tier system comprises a client 100, a server system 110, and a data server 120. A client application 101 is installed in the client 100, a server application 111 is installed in the server system 110, and another server application 121 is installed in the data server 120. Thus, the server application 111 also functions as a client application with respect to the server application 121. FIG. 7 illustrates, by way of example, the case where an object A of the client application 101 calls an object B of the server application 111 and the object B in turn calls an object C of the server application 121. Exchange of messages between these objects is achieved by means of an interface information file, an ORB mechanism and an inter-ORB communications protocol.

The interface information file is created for each of the client and server applications by describing interface information about the objects in an interface definition language (IDL) conformable to the syntax as provided by CORBA, followed by compiling with the use of a dedicated IDL compiler. In CORBA, the interface information file for the client is called a stub, and that. For the server is called a skeleton.

The client application 101 is associated with a stub 102 and an ORB mechanism 103, the server application 111 is associated with an ORB mechanism 112, a skeleton 113, a stub 114 and an ORB mechanism 115, and the server application 121 is associated with an ORB mechanism 122 and a skeleton 123. The stub 102 and the skeleton 113 are each an interface information file created by compiling an IDL file 131 describing information about the object B, and the stub 114 and the skeleton 123 are each an interface information file created by compiling an IDL file 132 describing information about the object C.

IIOP, which is a standard protocol of CORBA, is used for the communications between the ORB mechanisms 103 and 112 and between the ORB mechanisms 115 and 122.

Another server 140, which is also located on the network, provides a naming service 141. The naming service 141 serves to respond to an inquiry about where on the network the object that is needed by an object of an application exists, and constitutes a database in which objects are managed by their names along with the addresses of servers where the objects are located. Thus, a client application calls an object of a server application by its name, whereupon the ORB mechanism refers to the naming service 141 to obtain the address of the server system where the object of the server application is located. By making a request to the server system by means of the obtained address, it is possible to make use of the object.

The following explains how an object is called in the three-tier system configured as described above. First, the object A of the client application 101 calls the object B, and this means calling an object (operation) loaded into the stub 102 and corresponding to the object B. Since this operation does not have interface information necessary for communications, the ORB mechanism 103 refers to the naming service 141 and, based on the obtained address of the server system 110, sends a request of the client application 101 to the ORB mechanism 112 of the server system 110 by using the IIOP protocol. On receiving the request via the ORB mechanism 112, the object B transfers the request to the object C. Also in this case, communications are performed in a like manner by using the naming service 141 to acquire the address of the data server 120 on the network. The server application 121 of the data server 120 then processes the request from the object B. The object C supplies the object B with the result of processing, and the object B provides the object A with the response from the object C. Consequently, the client application 101 is supplied with the result of processing.

In three-tier systems such as the one described above, there often arises a need to use a large general-purpose computer as the third-tier data server 120. In such a case, the second-tier server system 110 performs a gateway process in which it merely transfers requests from the client 100 to the general-purpose computer. This configuration serves to improve the reliability and performance of the overall system and also permits reuse and effective use of existing database systems.

The CORBA technique is applied to open architecture-based computers fabricated using a standard operating system and standard hardware. General-purpose computers, on the other hand, are constructed based on their own architectures, and therefore, the problem mentioned below arises where a general-purpose computer is applied to the third tier in a three-tier system.

First, the general-purpose computer, which originally does not employ distributed object-oriented techniques, needs to be provided with an ORB mechanism for cooperation with the distributed object-oriented technique.

In CORBA, the individual object names must be unique on the network for the purpose of management; therefore, even if the interfaces between relevant twos of the three tiers are the same, two IDL definitions, that is, an IDL source defining the interface between the client application and the gateway application and an IDL source defining the interface information between the gateway application and the server application of the general-purpose computer, are needed.

Even in the case where the system is configured such that the second-tier server system functions as a gateway for merely transferring requests from the client to the general-purpose computer, the developer's coding is needed for the skeleton which accepts requests from the client, the stub which sends the requests to the general-purpose purpose computer, and for the gateway object, and associating the gateway object with the object of the server application of the general-purpose computer constitutes an implementation matter during creation of the gateway source.

Further, the ORB mechanism determines a destination system by referring to the naming service, and thus needs to communicate with the computer which provides the naming service. Accordingly, the naming service is used not only when the client sends a request to the server system but also when the server system sends a request to the general-purpose computer, which, however, consumes time for the communication process and lowers the performance of the system, compared with a distributed object system having a client/server configuration.

SUMMARY OF THE INVENTION

An object of the present invention is to provide a communication link information generating device which does not require the creation of a gateway, that is, coding, in cases where a general-purpose computer, which has no distributed object environment, is applied to a three-tier system, a medium storing a program therefor, and a threetier client/server system which does not require a long communication time.

To achieve the above object, there is provided a communication link information generating device for generating communication link information for a three-tier client/server system constituted by a client application, a gateway application, and a server application of a general-purpose computer. The communication link information generating device comprises input means for reading an application definition set in which interface information of the individual applications and communication information are defined, analyzing means for analyzing the read application definition set, interface definition language source creating means for creating, based on the application definition set, an interface definition language source defining interface information for communication between the client application and the gateway application, source code generating means for generating, based on the application definition set, a source code of the gateway application including communication information for communication with the general-purpose computer, and interface information file generating means for generating, based on the application definition set, an interface information file necessary for the server application to communicate with the gateway application.

To achieve the above object, there is also provided a three-tier client/server system constituted by connecting a general-purpose computer to a client and a server system. The three-tier client/server system comprises a client having a client application installed therein, the client application having interface information built therein which is created by compiling an interface definition language source generated based on a single application definition set, a server system having a gateway application installed therein, the gateway application having interface information built therein which is created by compiling an interface definition language source generated based on the application definition set so as to communicate with the client application by means of a distributed object-oriented technique, the gateway application also having communication link information built therein which is generated based on the application definition set for communication with a general-purpose computer, and a general-purpose computer having a server application installed therein, the server application having interface information built therein which is generated based on the application definition set so as to communicate with the gateway application by means of an existing communication procedure.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 3 is a diagram showing an example of an application definition;

DESCRIPTION OF THE PREFERRED EMBODIMENTS

The present invention will be outlined first with reference to the drawings.

Figure 1:
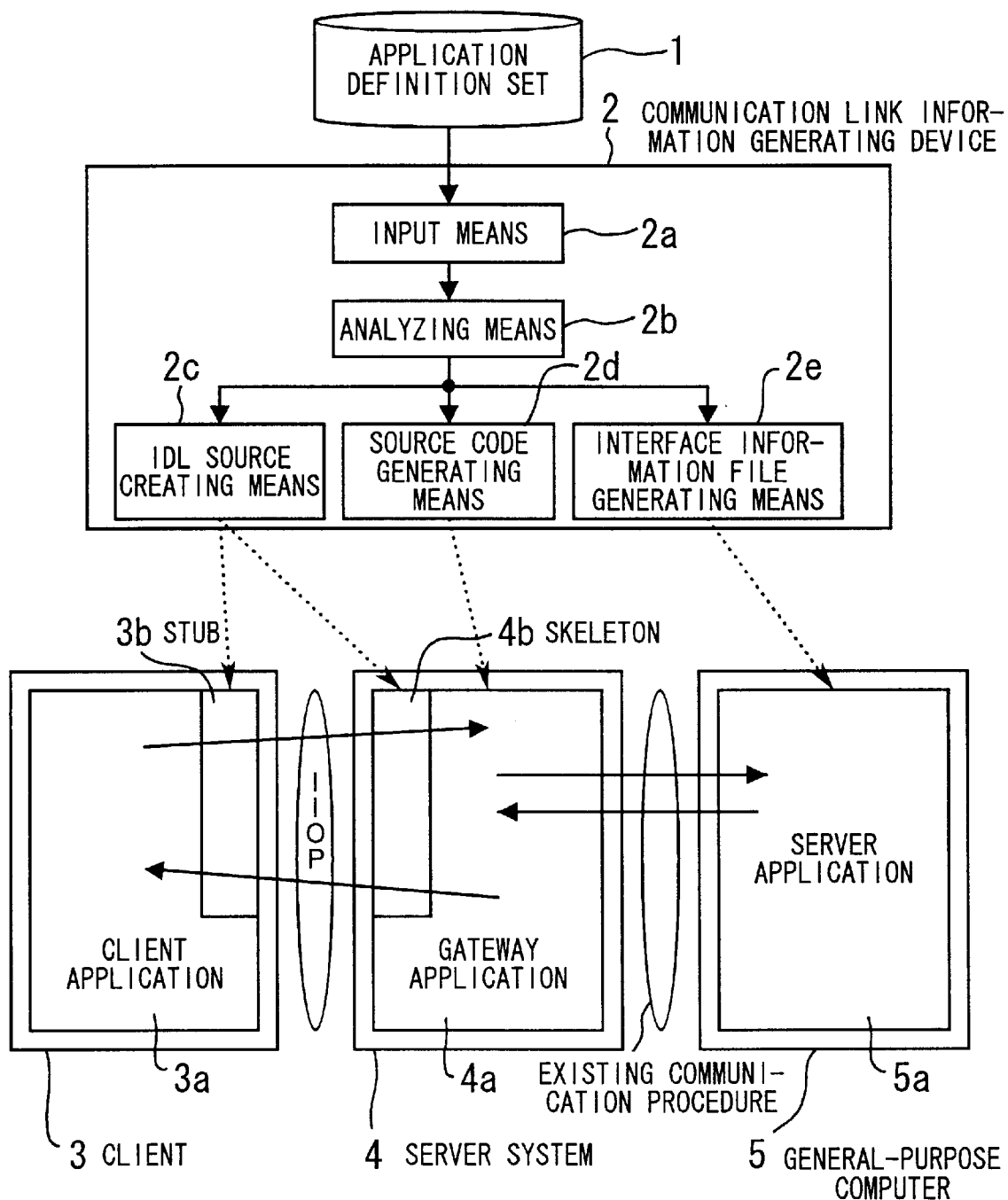
FIG. 1 is a diagram illustrating the configuration of a communication link information generating device and a three-tier client/server system according to the present invention.

FIG. 1 illustrates the configuration of a communication link information generating device and a three-tier client/ server system according to the present invention. In the upper part of FIG. 1 is shown a communication link information generating device 2 for generating information which links a client/server system in a distributed object environment with a general-purpose computer in a non-distributed object environment. The communication link information linking the three tiers together, that is, the client, the server system, and the general-purpose computer, is defined in a single application definition set 1. In this application definition set 1 are described object information, a communication destination which is communication link information permitting the general-purpose computer to be identified on the network, and interface information for interfacing between relevant twos of a client application, a gateway application and a server application. The communication link information generating device 2 comprises input means 2a for reading the application definition set 1, analyzing means 2b for analyzing the read application definition set 1, interface definition language (IDL) source creating means 2c for creating an interface definition language source for the client/server system based on the application definition set 1, source code generating means 2d for generating a source code of the gateway application of the server system based on the application definition set 1, and interface information file generating means 2e for generating an interface information file for the server application of the general-purpose computer based on the application definition set 1.

With this communication link in formation generating device 2, the input means 2a reads the application definition set 1 and the analyzing means 2b analyzes the contents thereof. The results of the analysis are distributed to the interface definition language source creating means 2c, the source code generating means 2d and the interface information file generating means 2e. The interface definition language source creating means 2c creates a source for a stub to be built into the client application of the client and for a skeleton to be built into the gateway application of the server system. The source code generating means 2d outputs a source code of the gateway application, taking into account the general-purpose computer as a communication destination. The interface information file generating means 2e outputs a file of interface information for interfacing with the gateway application, which file is to be built into the server application of the general-purpose computer. Thus, the communication link information generating device 2 creates the source code of the gateway application as well as the interface information file for the general-purpose computer, thereby eliminating the need for the coding of the gateway application.

In the lower part of FIG. 1, a three-tier client/server system including a general-purpose computer is shown, which system comprises a client 3, a server system 4, and a general-purpose computer 5. The client 3 has a client application 3a installed therein, and a stub 3b, created based on the source output from the interface definition language source creating means 2c is built into the client application 3a. The server system 4 acts as a gateway and has a gateway application 4a installed therein for performing a linking process with respect to the application of the large general-purpose computer 5 which is not based on distributed object-oriented techniques. The gateway application 4a is created based on the source code from the source code generating means 2d. At the time of creation, a skeleton 4b, created based on the source output from the interface definition language source creating means 2c, is built into the gateway application 4a. The general-purpose computer 5 has a server application 5a installed therein.

The client application 3a and the gateway application 4a utilize a distributed object-oriented technique (CORBA) to carry out the communication process. The communication process between the gateway application 4a and the server application 5a of the general-purpose computer, which is not based on the distributed object-oriented technique, is performed using an existing communication procedure. The existing communication procedure uses a communication destination as information specifying the general-purpose computer.

The gateway application 4a notifies the server application 5a in the general-purpose computer 5 of a request from the client application 3a, and also notifies the client application 3a of the result of processing of the server application 5a as a response. This permits the client application 3a to make use of the server application 5a of the general-purpose computer 5 from within a distributed object environment. In this case, when the client application 3a sends a request to the gateway application 4a, interface information is acquired using a naming service, but when the gateway application 4a transfers the request to the server application 5a, the existing communication procedure is used. Since the existing communication procedure directly uses the communication destination assigned to the general-purpose computer, the communication process with a target computer can be initiated immediately. Thus, for the communication process between the gateway application 4a and the server application 5a, it is unnecessary to communicate with a computer providing the naming service. Consequently, the processing time can be reduced by half, compared with the case of using ORB mechanisms, and the need to create an ORB mechanism in the general-purpose computer is eliminated.

The embodiment of the present invention will now be described in more detail. First, a procedure for generating communication link information for the three tiers of a three-tier system which is constituted by a client/server system in a distributed object environment and a general-purpose computer in a non-distributed object environment will be explained.

Figure 2:
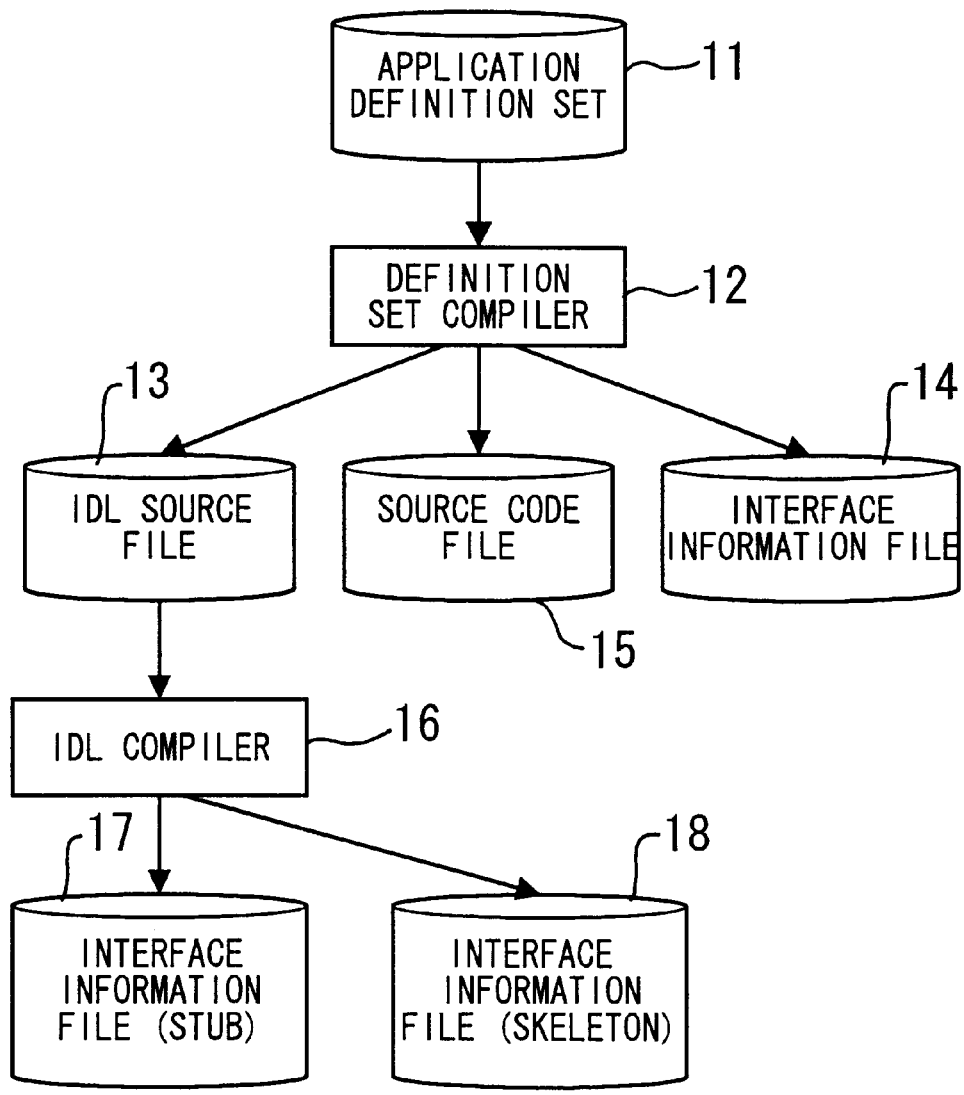
FIG. 2 is a diagram illustrating a communication information linking process of the three-tier client/server system.

FIG. 2 illustrates a communication information linking process of the three-tier client/server system. The communication link information for the three tiers, that is, the client, the server system functioning as a gateway, and the general-purpose computer, is defined in a single set called application definition set 11. It is necessary that in the application definition set 11, the client application, the gateway and the server application should be associated with one another; however, since the IDL definition according to CORBA is premised on sharing of one-to-one, for example, client-to-server interface information as well as on the use of IIOP protocol, the communication address for communication with the general-purpose computer cannot be described. For this reason, the interface information for the three tiers is defined by means of the application definition set 11 which is one level higher than the IDL definition. In the application definition set 11, the interface information for interfacing between relevant twos of the client application, the gateway and the server application and communication information for communication between the gateway and the server application are defined in the manner described below, for example.

FIG. 3 shows an example of an application definition. In the application definition set 11, the application definition is described in a manner almost similar to the IDL description, and object (operation) information, a communication destination and interface information are described repeatedly. The communication destination represents a communication destination on a general-purpose computer as viewed from the gateway, and a host name identifying one of the general-purpose computers on the network or the name of an application in the general-purpose computer is specified in the communication destination.

Referring again to FIG. 2, the application definition set 11, in which the interface information and communication destinations are defined as described above, is input to a definition set compiler 12. The definition set compiler 12 analyzes the application definition set 11, creates an IDL source file 13 for the client and gateway applications, and also generates an interface information file 14 including interface information necessary for the server application of the general-purpose computer to communicate with the gateway application, as well as a source code file 15 for the gateway application.

The IDL source file 13 defines the interface information in accordance with the syntax provided by the rules of CORBA, and therefore, a standard IDL compiler 16 conformable to ORB is used for the IDL compiling. Through the IDL compiler 16 are generated an interface information file (stub) 17 to be built into the client application and an interface information file (skeleton) 18 to be built into the gateway application. These interface information files 17 and 18 each correspond to a header file in C language programming, for example, and are each built into a corresponding application when the source of the application is compiled. The interface information file 14 corresponds to a skeleton file according to CORBA and is built into the server application when the source thereof is compiled.

The source code file 15 for the gateway application includes the communication address assigned to the general-purpose computer, which has been extracted from the application definition set 11, and this source is compiled to create a load module, so that the communication process is automatically built in. In cases where the gateway application is to perform a pass-through process alone, it is unnecessary for the application programmer to additionally implement the gateway source.

The above-described definition makes it possible to uniquely associate the individual objects of the client and gateway applications, the general-purpose computer and the server application thereof with one another. Also, the definition permits the objects in a distributed object environment to be associated individually with a plurality of general-purpose computers on the network.

Figure 4:
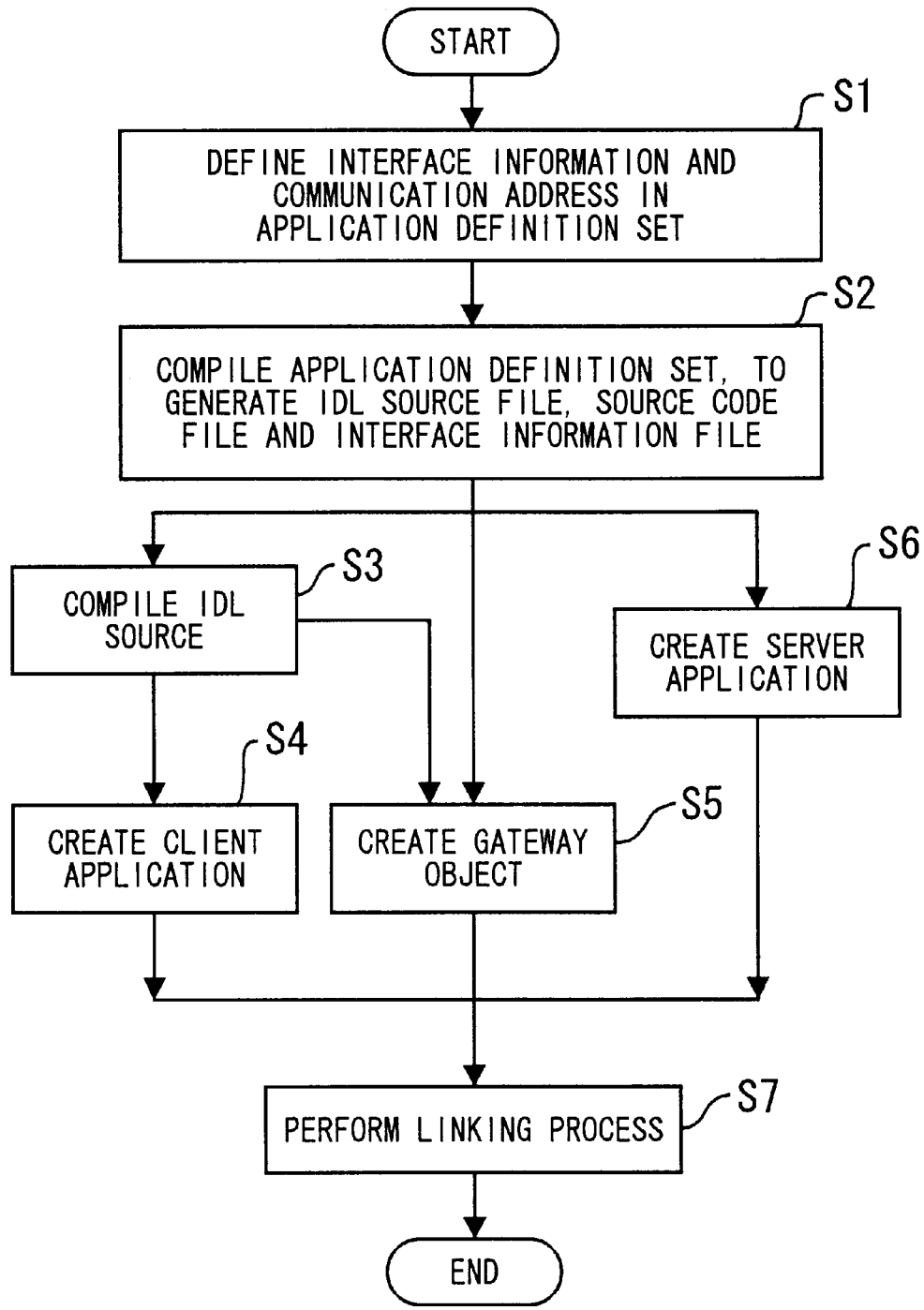
FIG. 4 is a flowchart showing the linking process of the three-tier client/server system.

FIG. 4 is a flowchart showing a linking process of the three-tier client/server system. First, the interface information and the communication address of the general-purpose computer are defined in the application definition set 11 (Step S1). The application definition set 11 is then compiled using the definition set compiler 12, to generate the IDL source file 13, the interface information file 14 and the source code file 15 (Step S2).

The IDL source file 13 is compiled by means of the IDL compiler 16 (Step S3), and using the resultant interface information file 17 generated in this manner, that is, the stub file, a client application is created (Step S4). Also, the object of a gateway application is created (Step S5) using the source code file 15 generated in Step S2 and the interface information file 18 generated as a result of the compiling in Step S3, that is, the skeleton file. Further, using the interface information file 14 generated in Step S2, a server application is created (Step S6). These applications are installed respectively in the client, the server and the general-purpose computer, thereby performing a linking process for the three tiers (Step S7).

Figure 5:
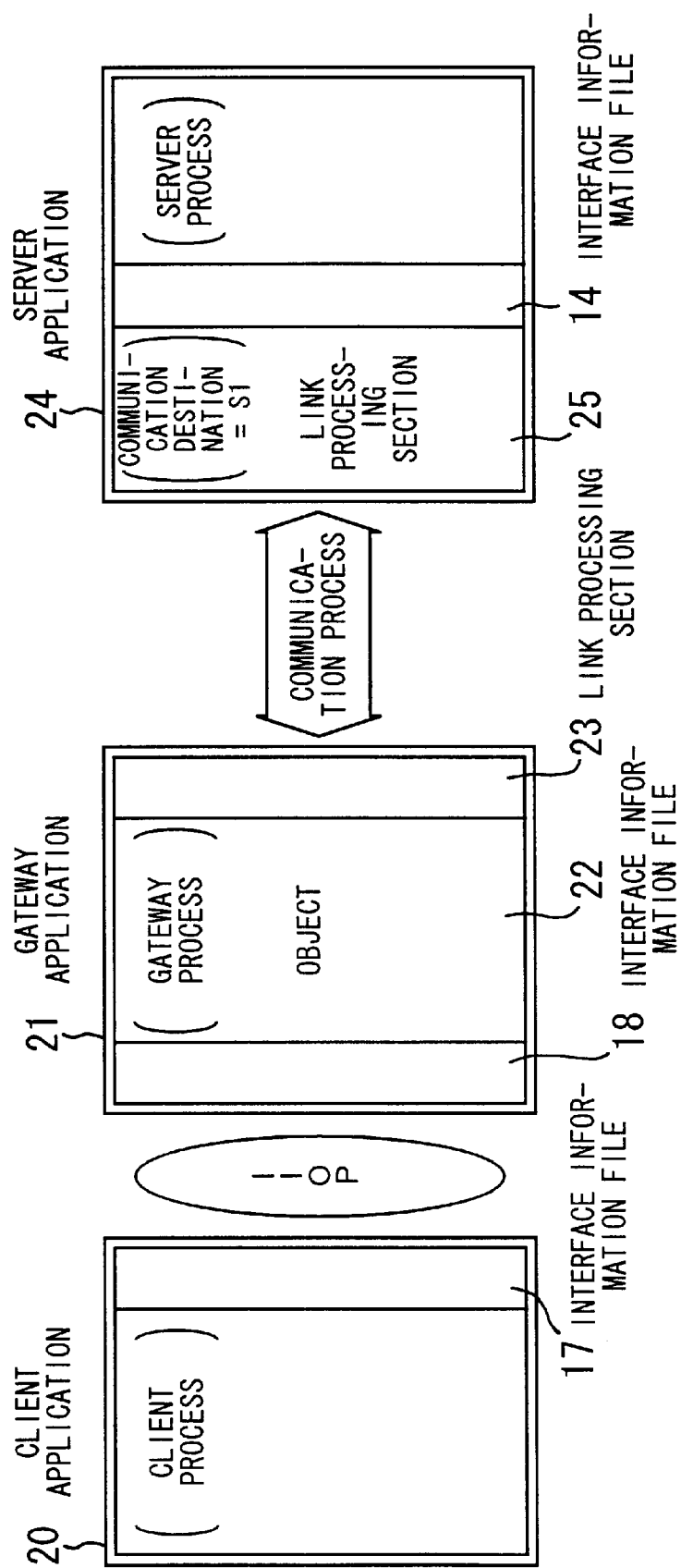
FIG. 5 is a diagram illustrating the configuration of the three-tier client/server system which has been subjected to the linking process.

FIG. 5 illustrates the configuration of the three-tier client/server system which has been subjected to the linking process. In FIG. 5, a client application 20 has the interface information file 17 built therein which is obtained through compiling by the IDL compiler 16. A gateway application 21 is constituted by the interface information file 18 obtained through compiling by the IDL compiler 16, an object 22, and a link processing section 23 for performing a linking process with respect to a server application 24. The server application 24 is, for example, a COBOL (Common Business Oriented Language)-based application constituted by a link processing section 25, the interface information file 14 generated by means of the definition set compiler 12, and a server processing section including, for example, a database process. The interface information file 14 is, for example, a library function file described in COBOL.

The client application 20 performs a client process, that is, it calls the server application 24 and receives the result of processing of the same. The object 22 of the gateway application 21 includes the communication destination information (e.g., communication destination=S1) necessary for using the existing communication procedure for communication with the server application 24 of the general-purpose computer and performs a gateway process. The server application 24 has, for example, the communication destination=S1, and has the same communication address as the destination of transfer from the object 22.

The operation of the three-tier client/server system will now be explained.

Figure 6:
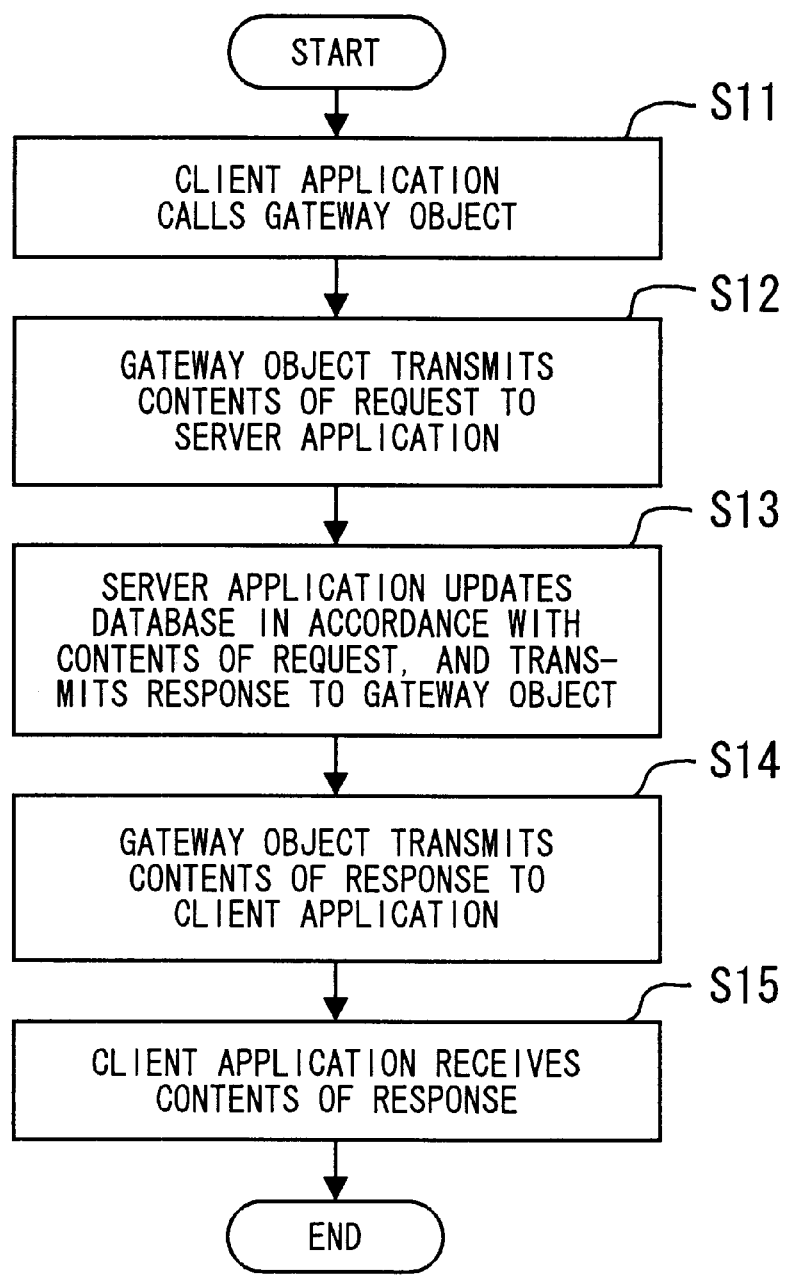
FIG. 6 is a flowchart showing an operation flow of the three-tier client/server system.
Figure 7:
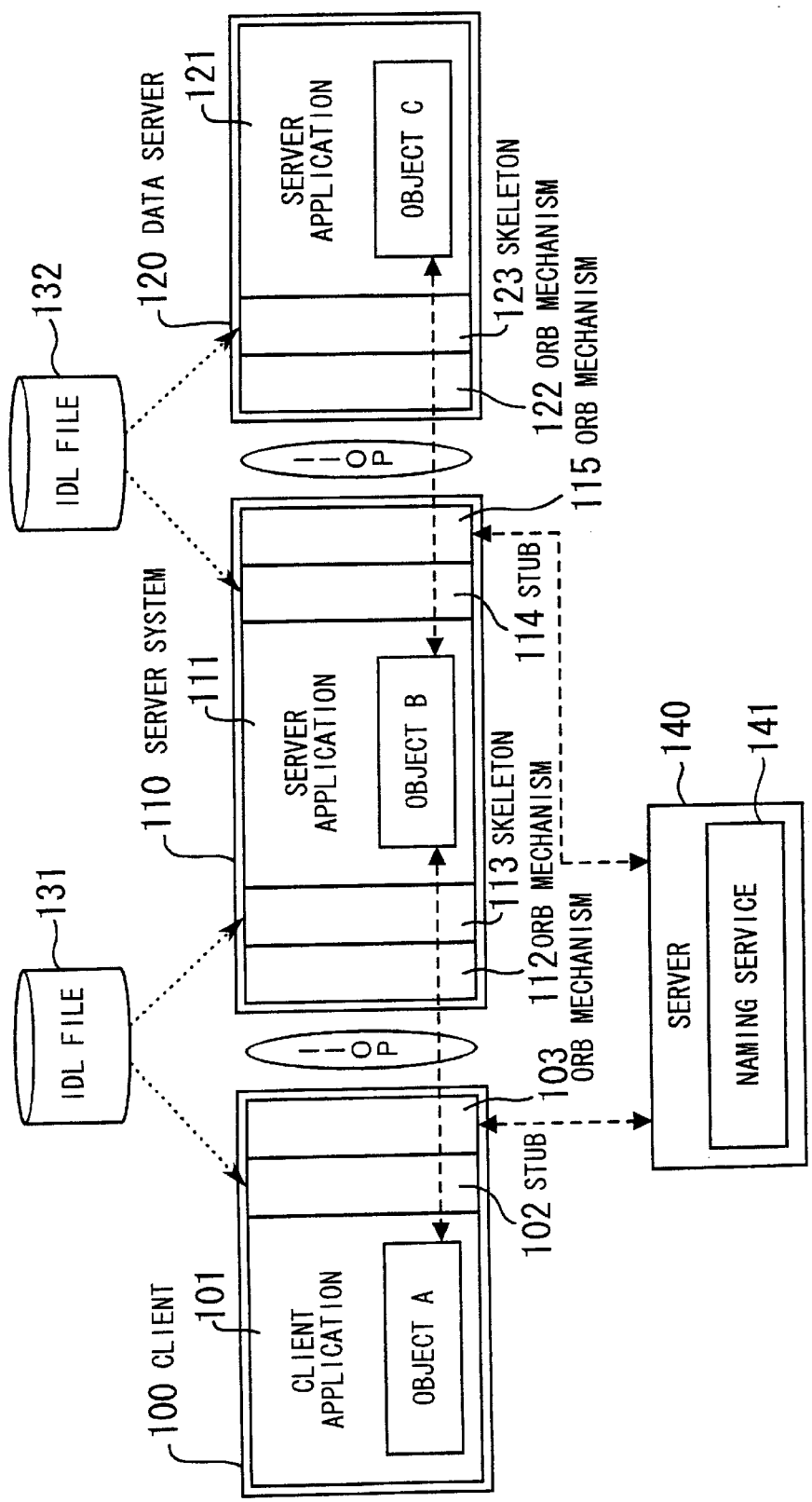
FIG. 7 is a diagram showing an example of construction of a three-tier system.

FIG. 6 is a flowchart showing an operation flow of the three-tier client/server system. First, using the interface information file (stub) 17, the client application 20 calls the gateway object 22 of the gateway application 21 (Step S11). The gateway object 22 converts the contents of a request from the client application 20 and transmits the converted request to the server application 24 using the existing communication procedure (Step S12). On receiving the request from the client application 20 according to the existing communication procedure, the server application 24 updates the database in accordance with the contents of the request, and transmits a response to the gateway object 22 with the use of the existing communication procedure (Step S13). The gateway object 22 transmits the contents of the response, which it has received by means of the existing communication procedure, to the client application 20 by utilizing the interface information file (skeleton) 18 (Step S14). The client application 20 receives the result of updating the database as the contents of the response (Step S15).

As described above, the present invention has a construction such that communication link information for a three-tier system is obtained from a single application definition set. It is, therefore, unnecessary to perform a communication process between the server application and an application of the general-purpose computer in order to accomplish the communication linking process between the application of the general-purpose computer having no distributed object environment (ORB mechanism) and a client application in a distributed object environment, or to implement the interface information.

The communication process between the gateway and the general-purpose computer utilizes an existing communication procedure and does not make use of a naming service; therefore, the communication processing time is reduced by half and the performance of the client application can be improved.

On the part of the client application, it is unnecessary to recognize linkage with an application of the general-purpose computer which is outside the distributed object environment, and therefore, the client application can request processing of an application of the general-purpose computer as if it calls a program in the local system.

The interface between the client and server applications is described in IDL conformable to the OMG, and thus the source file thereof can be compiled using an ordinary IDL compiler, making it possible to keep the client side standardized.

Also, since a source code for the gateway of which the interface information is assured of correctness can be generated, no coding for the gateway is required and the work load on the application developers is lightened.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A communication link information generating device for generating communication link information for a three-tier client/server system comprising a client application, a gateway application, and a server application on a general-purpose computer, said device comprising:

input means for reading an application definition set in which interface information of the individual applications and communication information are defined;

analyzing means for analyzing the read application definition set;

interface definition language source creating means for creating, based on the application definition set, an interface definition language source defining interface information for communication between the client application and the gateway application in an object-oriented environment;

source code generating means for generating, based on the application definition set, a source code of the gateway application including communication information for communication with the general-purpose computer in a nonobject-oriented environment; and interface information file generating means for generating, based on the application definition set, an interface information file necessary for the server application to communication with the gateway application in a nonobject-oriented environment.

2. The communication link information generating device according to claim 1, wherein the application definition set includes object information, a communication destination identifying the general-purpose computer on a network, and interface information for interfacing between relevant twos of the client application, the gateway application and the server application.

3. The communication link information generating device according to claim 1, wherein the interface definition language source created by said interface definition language source creating means comprises a source which, when compiled, generates a stub to be built into the client application and a skeleton to be built into the gateway application.

4. The communication link information generating device according to claim 1, wherein the source code generated by said source code generating means comprises a source code of an object which, when called by an object of the client application, performs a pass-through process for communication with a specified general-purpose computer.

5. The communication link information generating device according to claim 1, wherein the interface information file generated by said interface information file generating means comprises a library function file which is to be built into the server application when a program of the server application is compiled.

* * * * *